(12) United States Patent
Park et al.

(10) Patent No.: US 7,970,806 B2
(45) Date of Patent: Jun. 28, 2011

(54) METHODS AND APPARATUS FOR FILE MANAGEMENT USING PARTITIONED FILE METADATA

(75) Inventors: Jeong-woo Park, Gyeonggi-do (KR); Gwang-ok Go, Gyeonggi-do (KR); Jun-young Cho, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 611 days.

(21) Appl. No.: 12/015,878

(22) Filed: Jan. 17, 2008

(65) Prior Publication Data

US 2009/0100115 A1    Apr. 16, 2009

(30) Foreign Application Priority Data

Oct. 12, 2007    (KR) .................. 10-2007-0103183

(51) Int. Cl.
*G06F 17/30*    (2006.01)
(52) U.S. Cl. ................ 707/824; 707/828
(58) Field of Classification Search ........... 707/999.002, 707/999.205, 824, 828
See application file for complete search history.

(56) References Cited

U.S. PATENT DOCUMENTS

| | | | |
|---|---|---|---|
| 2007/0143378 A1* | 6/2007 | Gorobets | 707/205 |
| 2007/0168698 A1* | 7/2007 | Coulson et al. | 714/5 |
| 2007/0245409 A1* | 10/2007 | Harris et al. | 726/5 |
| 2009/0043984 A1* | 2/2009 | Chang et al. | 711/173 |
| 2009/0100003 A1* | 4/2009 | Lahtinen | 707/2 |
| 2009/0157948 A1* | 6/2009 | Trichina et al. | 711/103 |
| 2010/0023582 A1* | 1/2010 | Pedersen et al. | 709/203 |

FOREIGN PATENT DOCUMENTS

| | | |
|---|---|---|
| JP | 09-044394 | 2/1997 |
| KR | 1020040072757 A | 8/2004 |
| KR | 1020060039373 A | 5/2006 |
| KR | 1020070021849 A | 2/2007 |

OTHER PUBLICATIONS

Woodhouse, David, "JFFS: The Journalling Flash File System," Red Hat, Inc., dwmw2@Cambridge.redhat.com, 12 pages, Admitted Prior Art.

* cited by examiner

*Primary Examiner* — James Trujillo
*Assistant Examiner* — Soheila Davanlou
(74) *Attorney, Agent, or Firm* — Myers Bigel Sibley & Sajovec, P.A.

(57) ABSTRACT

Management of files in a memory, such as a flash memory, includes storing in the memory a first node including a first type of metadata of the file, a second node including data of the file and a third node including a second type of metadata of the file including file status and memory location information for the first and second nodes. The third node may include a node including memory location information for the second node and a node including an index table that cross-references a memory location for the memory location information for the second node to a memory location of the first node. Methods and devices may be provided.

21 Claims, 14 Drawing Sheets

US 7,970,806 B2

METHODS AND APPARATUS FOR FILE MANAGEMENT USING PARTITIONED FILE METADATA

CROSS-REFERENCE TO RELATED APPLICATION

This application claims priority under 35 U.S.C. §119 from Korean Patent Application No. 10-2007-0103183, filed Oct. 12, 2007, the disclosure of which is hereby incorporated by reference herein in its entirety.

FIELD OF THE INVENTION

The present invention relates to memory systems and methods and, more particularly, to file management systems and methods.

BACKGROUND OF THE INVENTION

Flash memory devices typically are electrically erasable and/or programmable and are often used for data storage in relatively large units. Flash memory is widely used, for example, for storage of operating system and other computer programs for computers and computer-controlled devices, and for storage of video, audio and/or other media files for consumer devices, such as digital cameras and music players.

FIG. 1 illustrates a conventional use of flash memory. A CPU 11 and random access memory (RAM) 14 communicate over a bus 15, which may include data and control signal lines. The RAM 14 may be used to temporarily store program code, such as operating system and applications programs, and data upon which the CPU 11 operates. A flash memory controller 12 is also coupled to the bus 15, and controls data transfer between the bus 15 and a flash memory 13, which may be used for non-volatile storage of information used by the CPU 11 and RAM 14. For example, in some applications, a boot program may be stored in the flash memory 13, and the CPU 11 may load the boot program via the flash controller 12. In further applications, data, such as audio and video files, may be transferred between the flash memory 13 and the bus 15 via the flash controller 12.

In some applications, the RAM 14 may be used to support management of a file system for the flash memory 13. Referring to FIG. 2, an application 21 may read and write data through a file system manager 22 that interfaces with a flash memory 24 via flash translation logic (FTL) 23 that converts disk-oriented address information, i.e., sector addresses, to flash address information, e.g., block and page address information. The FTL 24 may be implemented, for example, in a flash controller, such as the flash controller 12 described above with reference to FIG. 1.

A variety of different file systems may be used with flash memory. FIG. 3 illustrates a conventional FAT (file allocation table) file system, including a BIOS Parameter Block BPB region, a FAT table region, a directory entry region, and a data region. Flash translation logic FTL converts sector numbers in the FAT file system to block and page numbers, such that the FAT table, directory entries and data are stored in at particular block and page locations in the flash memory.

FIGS. 4 and 5 illustrate an example of operations that may occur when using FAT file system in a NAND flash memory application. Referring to FIG. 4, information from a sector 6 of a FAT system is mapped by a flash translation layer FTL to block 0, page 2 of a flash memory. Referring to FIG. 5, if data in block 0, page 2 is modified, the sector 6 is remapped to a new page 3 in block 0. In particular, the flash translation layer FTL may search the flash memory for a free page and write the modified data to the free page. The prior page is then marked as invalid until a "garbage collection" process is executed to erase invalid pages so that they may be freed for future writes.

As FAT file systems were originally developed for use with disk drives with different characteristics than flash memory, other types of file systems have been developed that are more tailored to the characteristics of flash memory. Examples of such file systems include JFFS and JFFS2, described in an article "JFFS: The Journalling Flash File System," by David Woodhouse, presented at the Ottawa Linux Symposium in 2001.

SUMMARY OF THE INVENTION

Some embodiments of the present invention provide methods of managing files in a memory which include storing in the memory a first node including a first type of metadata of the file, a second node including data of the file and a third node including a second type of metadata of the file including file status and memory location information for the first and second nodes. In some embodiments, the methods may further include reading the third node to retrieve memory location information for the first node and/or the second node and accessing the first node and/or the second node based on the retrieved memory location information. The first type of metadata may include information less likely to change than the second type of metadata. For example, the first type of metadata may include file identification information and/or file creation information, and the second type of metadata may include file status information.

According to further embodiments, the third node includes a node including memory location information for the second node and a node including an index table that cross-references a memory location for the memory location information for the second node to a memory location of the first node. The methods may further include retrieving memory locations for nodes including the first type of metadata based on the index table, reading nodes including the first type of metadata responsive to the retrieved memory locations, identifying the first node from among the read nodes including the first type of metadata, retrieving a memory location of the node including memory location information for the second node corresponding to the identified first node and accessing the second node responsive to the retrieved memory location of the node including memory location information for the second node corresponding to the identified first node.

The methods may further include performing a file write operation wherein data of the file and the second type of metadata of the file are written as new nodes in the memory without writing the first type metadata in a new node in the memory. In further embodiments, new nodes including respective portions of the data of the file and new nodes including the second type of metadata including memory location information for nodes including the portions of the data are intermittently written in a periodic or aperiodic fashion.

Further embodiments of the present invention provide methods of managing files in memory including managing a first class of metadata of the file including file identification information and a second class of metadata of the file including file state information and memory location information of the file as respective first and second types of nodes in the memory. Over a series of write operations for the file, the second type of node may be written to the memory more frequently than the first type of node. In a file write operation for the file, writing a new node of the second type to a new memory location without writing a new node of the first type.

According to additional embodiments of the present invention, an apparatus includes a memory control circuit configured to communicate with a memory and a file system manager circuit operatively coupled to the memory control circuit and configured to cause the memory control circuit to store in the memory a first node including a first type of metadata of a file, a second node including data of the file and a third node including a second type of metadata of the file including file status and memory location metadata for the first and second nodes. Further embodiments of the present invention provide computer program products including computer program code embodied in a computer-readable storage medium, the computer program code including program code configured to cause storage in the memory of a first node including a first type of metadata of a file, a second node including data of the file in the memory and a third node including a second type of metadata of the file including file status and memory location information for the first and second nodes. Still further embodiments provide a memory device including a nonvolatile storage medium wherein a file is stored as a first node including a first type of metadata of the file, a second node including data of the file and a third node including a second type of metadata of the file including file status information and memory location information for the first and second nodes.

DETAILED DESCRIPTION OF EMBODIMENT OF THE INVENTION

Figure 1:
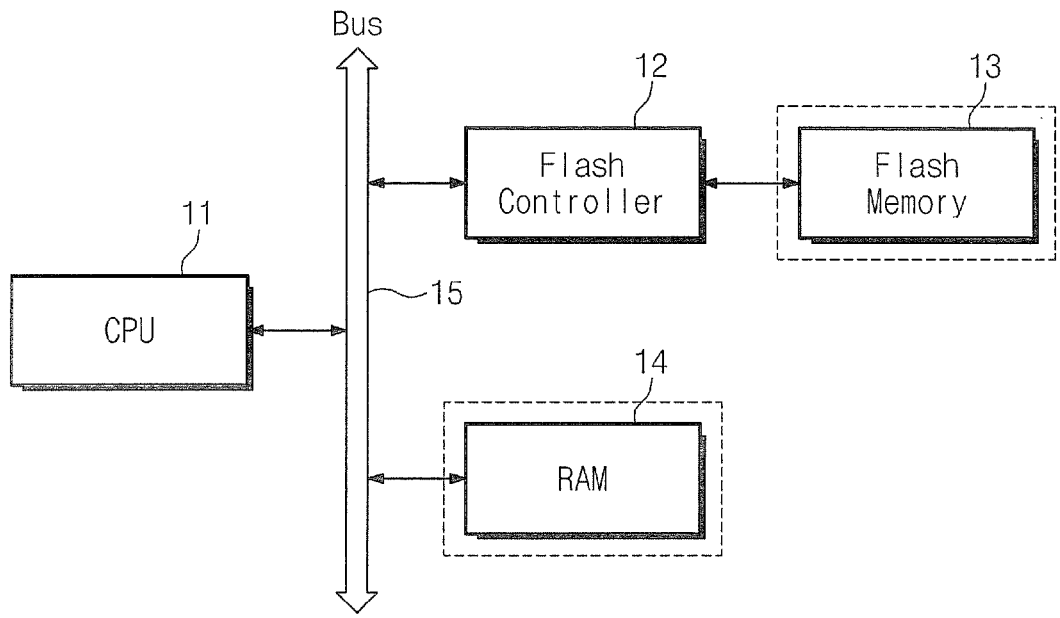
FIG. 1 is a schematic block diagram illustrating a conventional computing system architecture.
Figure 2:
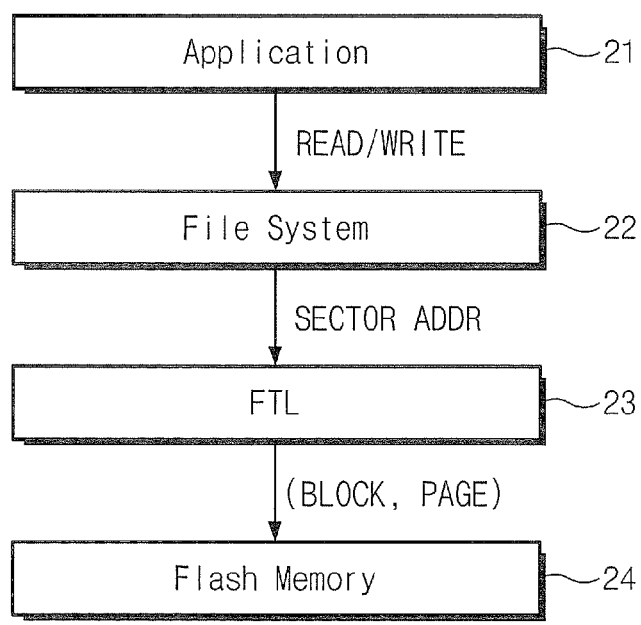
FIGS. 2-5 are schematic block diagrams illustrating a conventional FAT-based file system for flash memory.
Figure 3:
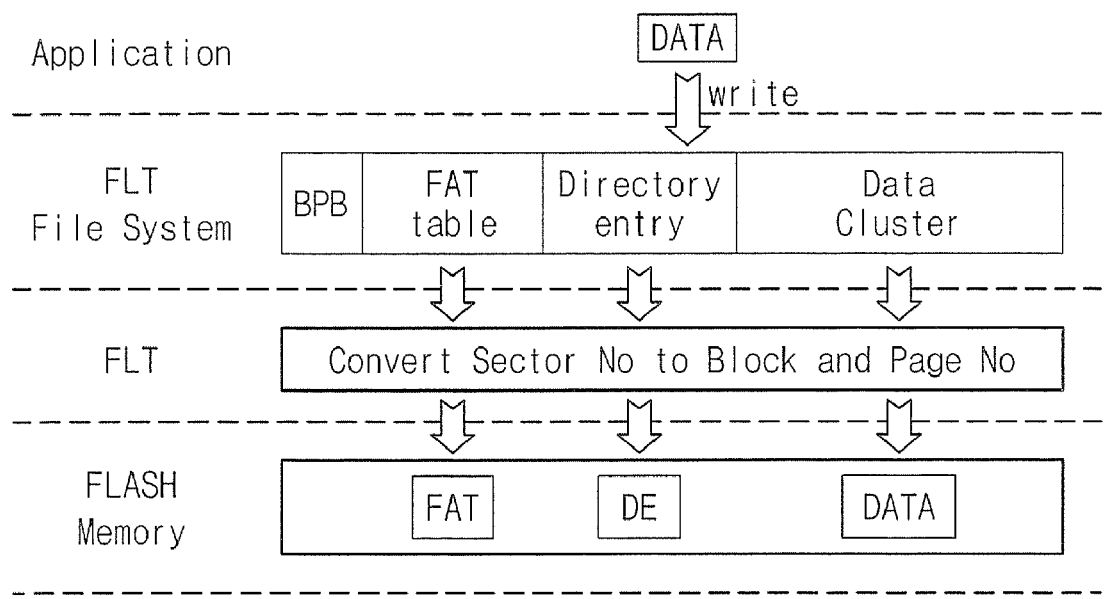
Figure 4:
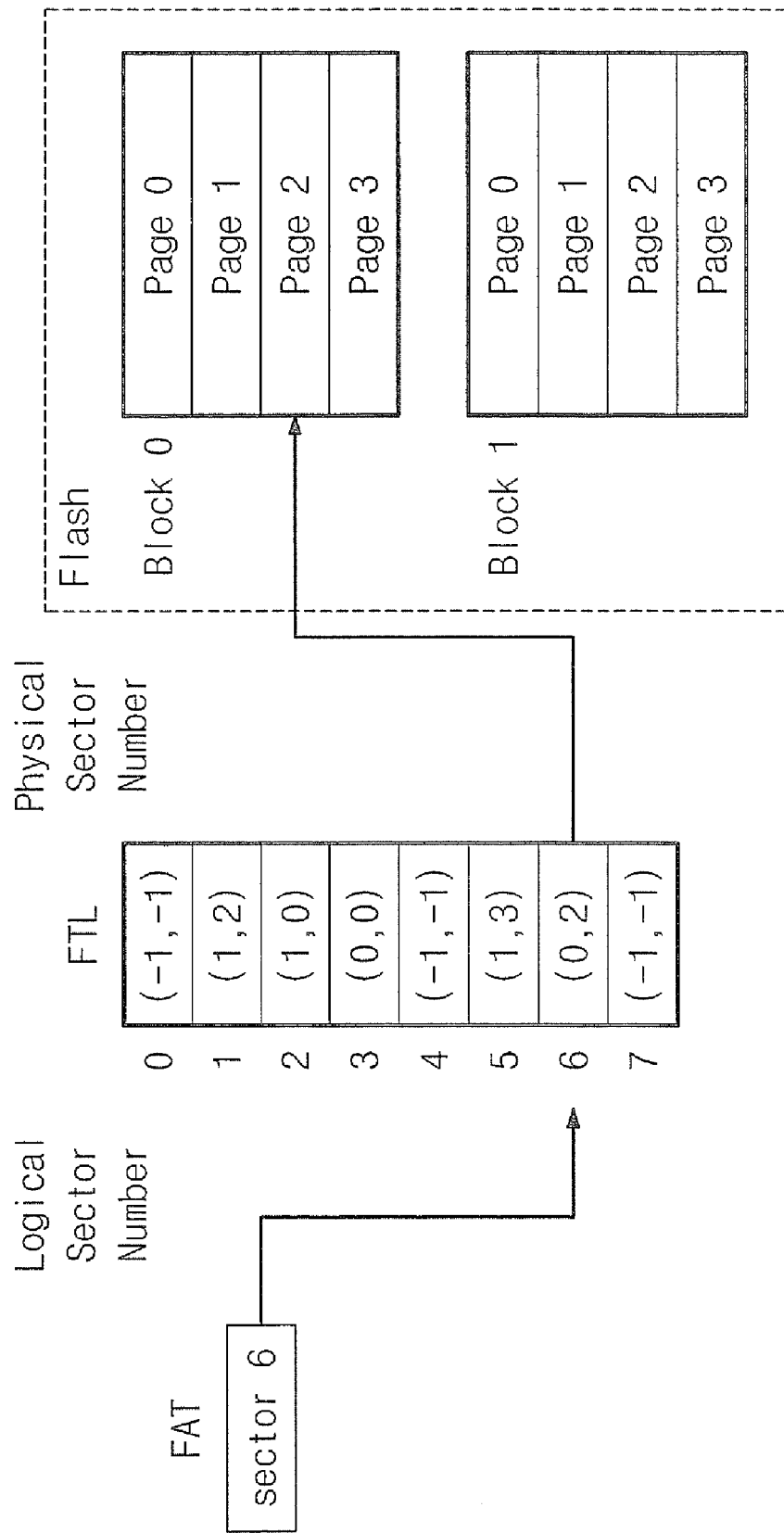
Figure 5:
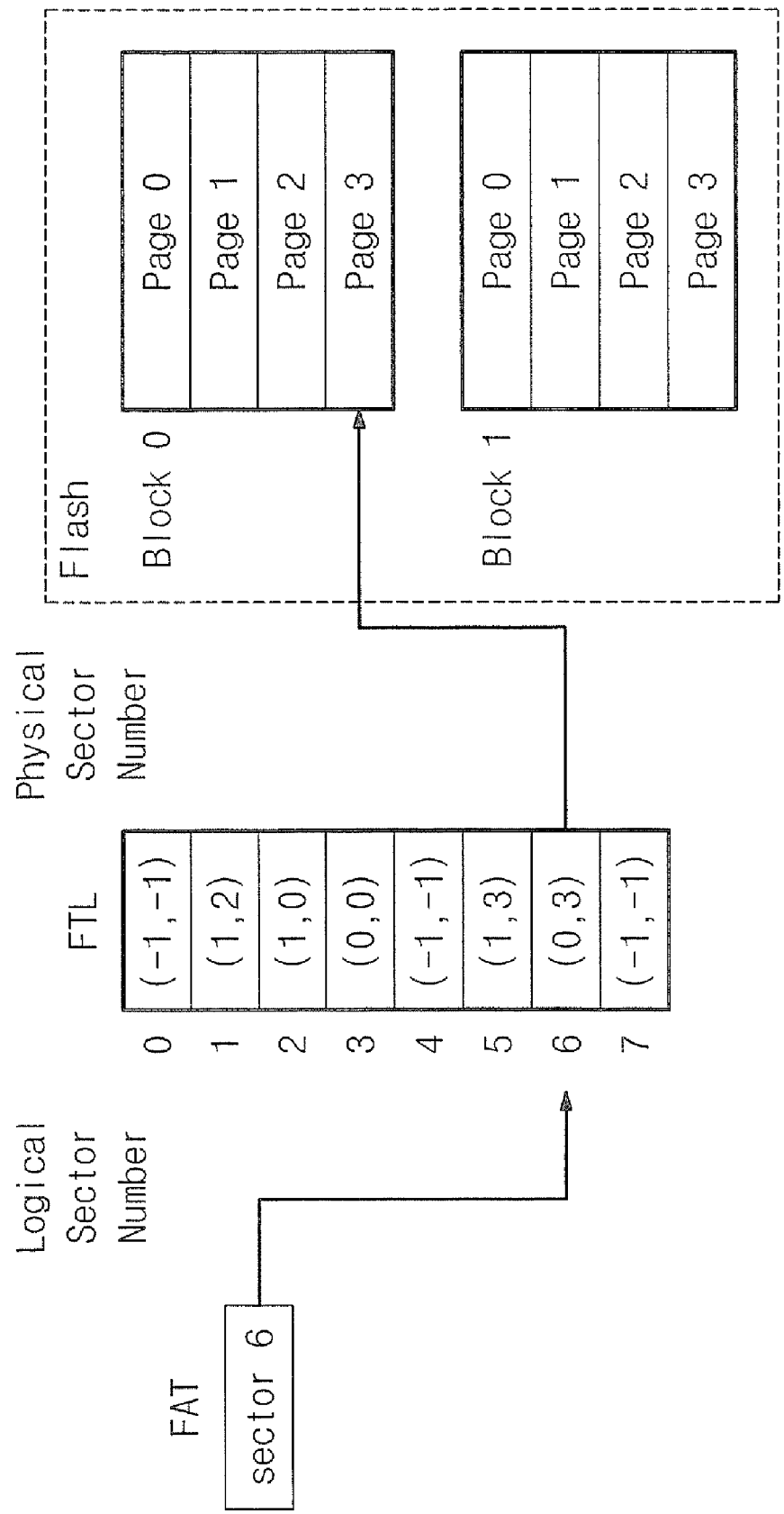

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

In the drawings, the sizes or configurations of elements may be idealized or exaggerated for clarity. It will be understood that when an element is referred to as being "connected to" or "coupled to" another element, it may be directly connected or coupled to the other element or intervening elements may be present. In contrast, when an element is referred to as being "directly connected to" or "directly coupled to" another element, there are no intervening elements present. Like numbers refer to like elements throughout. As used herein, the term "and/or" includes any and all combinations of one or more of the associated listed items.

It will be understood that, although the terms first, second, third etc. may be used herein to describe various elements, components and/or sections, these elements, components and/or sections should not be limited by these terms. These terms are only used to distinguish one element, component, or section from another element, region or section. Thus, a first element, component or section discussed below could be termed a second element, component or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification, and will not be interpreted in an idealized or overly formal sense unless expressly so defined herein.

Certain embodiments of the present invention are described below in application to flash memory devices. It will be appreciated, however, that the present invention applicable to other types of memory systems including, but not limited to, other types of solid state memory devices, magnetic memory systems and optical memory systems.

Some embodiments of the present invention arise from a realization that more efficient storage of files in devices, particularly devices having characteristics such as those of a flash memory, e.g., block erase and similar constraints, may be achieved by distinguishing between file metadata that is relatively "static," such as filename, creation date and the like, and metadata that is more "dynamic," such as file size, last edit date and the like. These different types of information may be stored in memory in two different types of memory "nodes", i.e., independent memory storage units, such that the "static" metadata need not be rewritten each time the file is updated with new data. This may reduce the amount of memory space that is consumed over a series of updates, and thus can reduce the overhead attributable to memory management functions, such as garbage collection.

Figure 6:
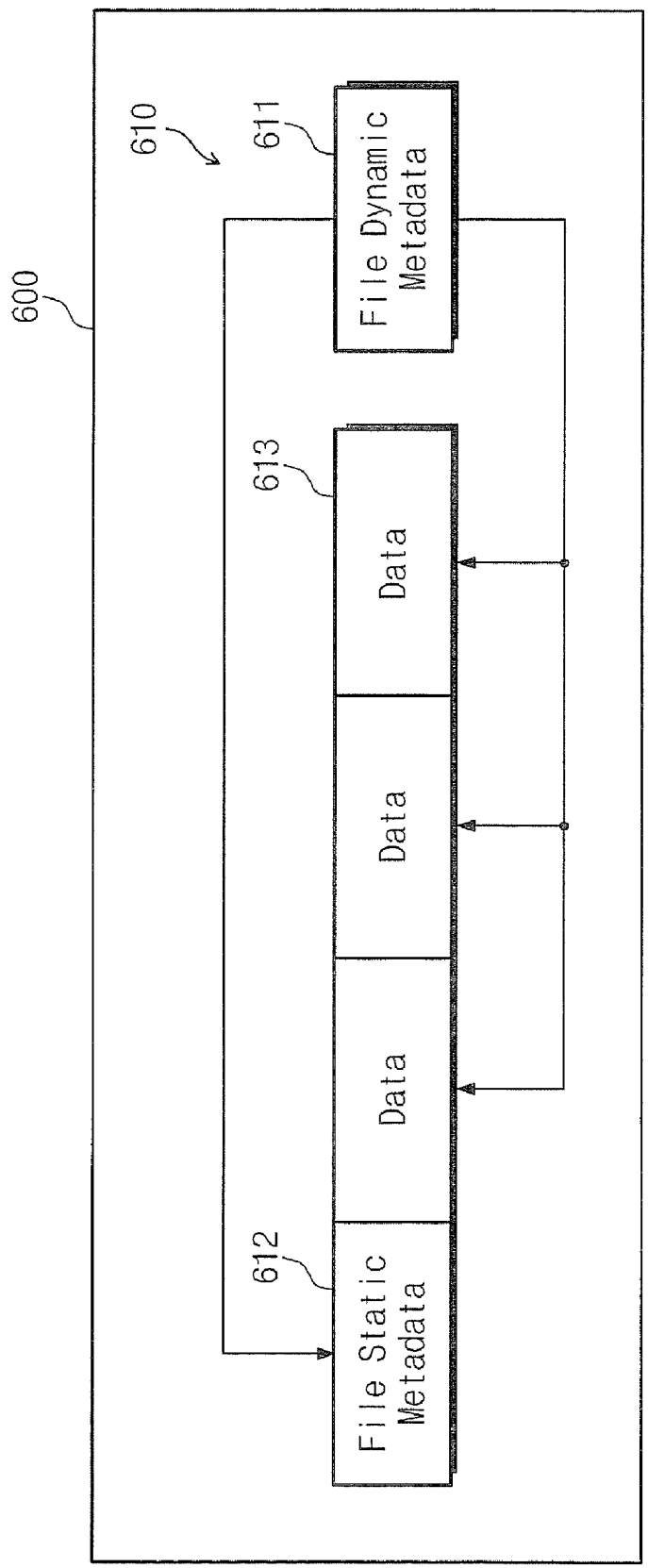
FIG. 6 is a schematic block diagram illustrating a file system according to some embodiments of the present invention.

FIG. 6 illustrates a file system 610 implemented in a flash memory 600 according to some embodiments of the present invention. According to the file system 610, a file is stored in the flash memory 600 using three different types of nodes. A first type of node 611 includes dynamic file metadata, e.g., metadata of the file that tends to change frequently, such as file size, last modified time, file allocation information, and the like. A second type of node 612 includes static file metadata, e.g., metadata of the file that tends to change less frequently, such as file ID, created date, file name, and the like. A third type of node 613 includes data of the file, e.g., data other than metadata, such as numeric, graphic, textual, audio and/or video data. The first type of node 611, i.e., the dynamic metadata node, includes flash memory location information (e.g., memory addresses) for the second and third types of nodes 612, 613, such that the dynamic metadata node 611 may be accessed to find the static metadata node 612 and the data node(s) 613. As will be described in detail below, the use of such an arrangement may allow reduced rewrites of data to flash memory as the file is modified, as the static metadata node 612 may be left unchanged over several file modifications, such that this metadata need not be rewritten with each file write operation to the flash memory.

Figure 7:
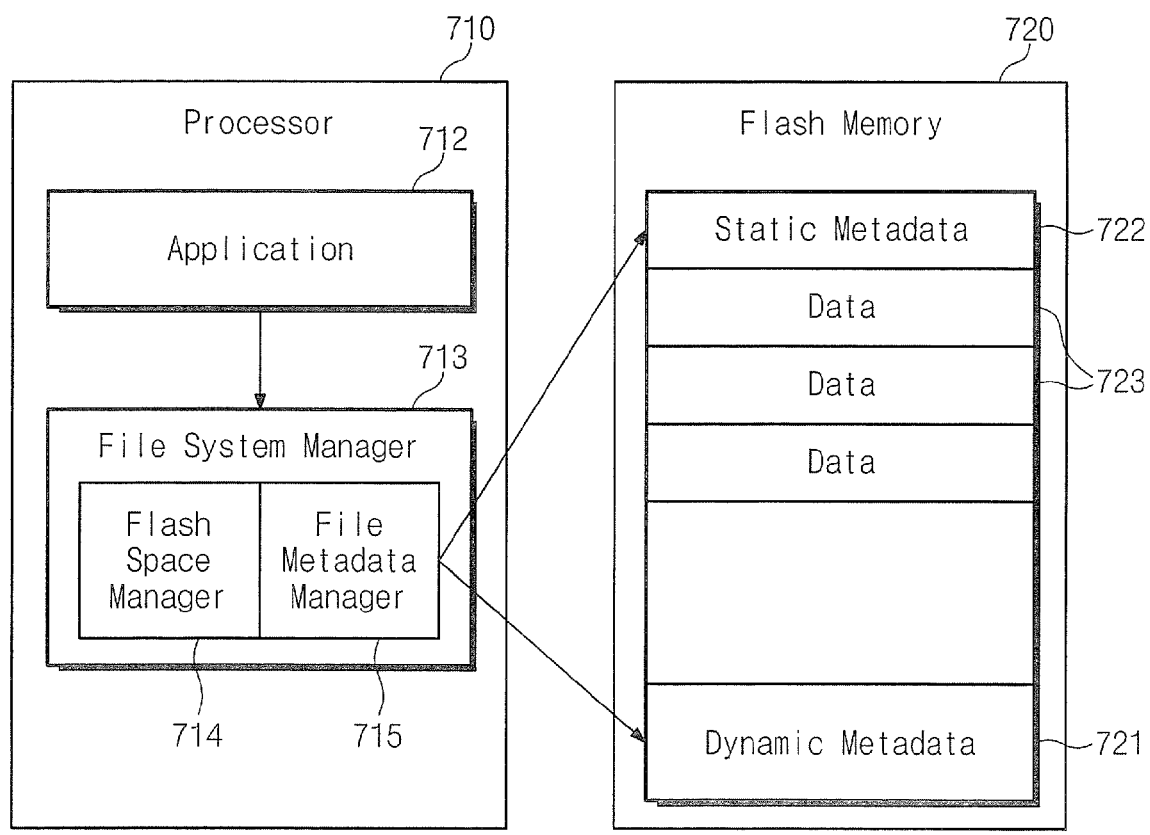
FIG. 7 is a schematic block diagram illustrating apparatus and operations for the file system of FIG. 6.

FIG. 7 illustrates apparatus and methods for implementing a file system including dynamic metadata nodes 721, static metadata nodes 722 and data nodes 723 in a flash memory 720 according to some embodiments of the present invention. An application 712 executing on a processor 710 (the processor 710 may include, for example, a computing device, such as microprocessor, and associated memory) provides data to a file system manager 713 executing on the processor 710. The file system manager 713 is configured to store and retrieve data from a flash memory 720. As illustrated, the file system manager 713 may include a flash space manager 714 configured to provide space management functions for file management in the flash memory 720, such as identification and selection of free memory locations and garbage collection for invalidated memory locations. The file system manager 713 may further include a file metadata manager 715 configured to maintain the dynamic metadata node 721 and the static metadata node 722.

It will be appreciated that the nodes 721, 722, 723 may be arranged in the flash memory in a number of different ways. For example, the data nodes 723 may be stored along block/page boundaries, e.g., each data node 723 may correspond to a page. The nodes 721, 722, 723 may also be arranged to make use of partitions defined in the memory space of the flash memory 720. For example, as shown in FIG. 7, the static metadata node 722 and the data node(s) 723 may be stored in order in "data blocks" of the flash memory device 720, while the dynamic metadata node 721 is stored in a "meta block" of the memory device 720. This may facilitate retrieval of the dynamic metadata node 721 when attempting to access memory location information for the static metadata and data nodes 722, 723 during read operations along the lines described below with reference to FIG. 9, as the file metadata manager 715 can limit retrieval of file dynamic metadata to the "meta blocks" of the device 720 without having to read through the data blocks of the memory device 720. It will be appreciated that other types of partitioning may be used.

Figure 8:
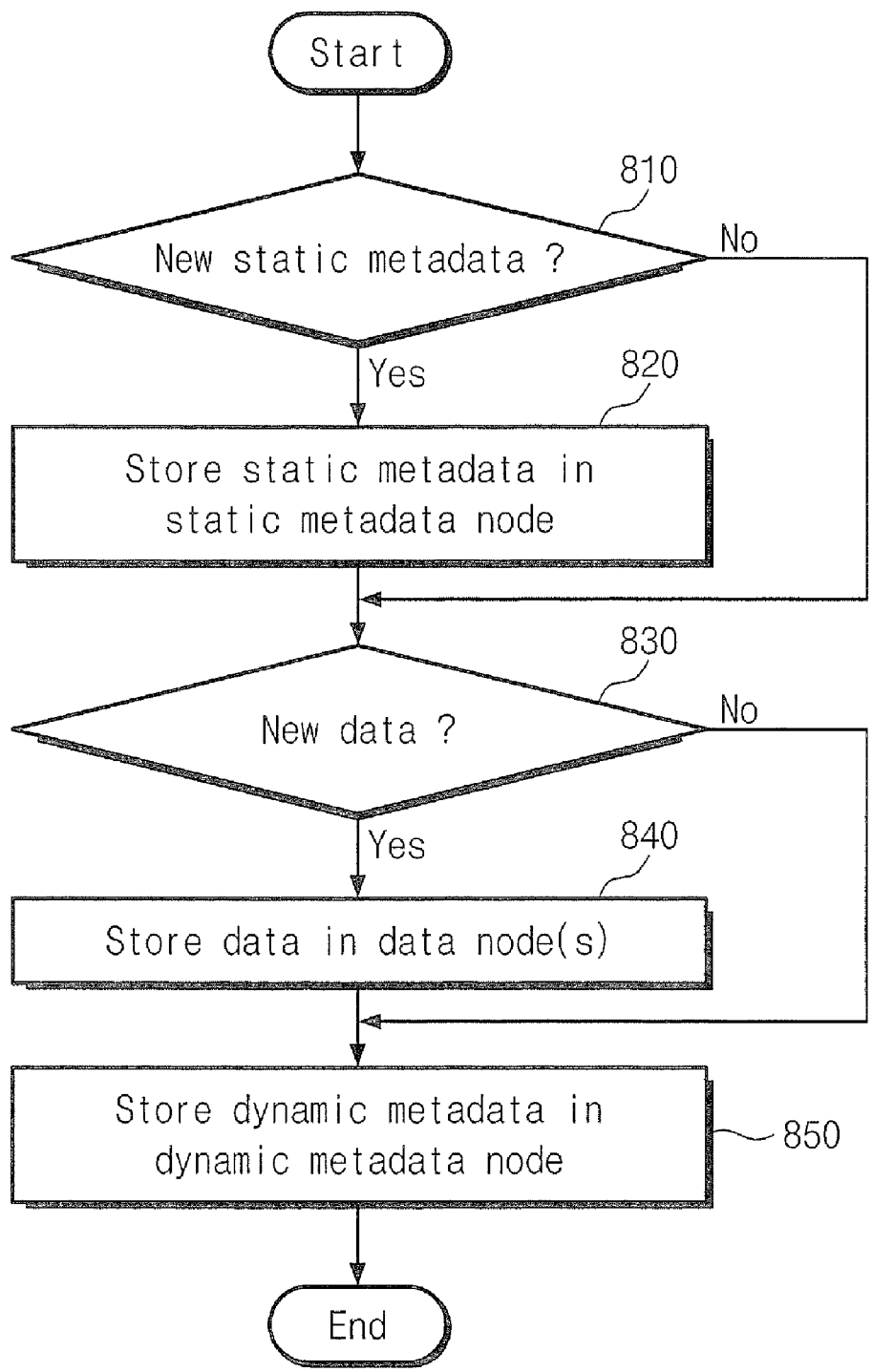
FIG. 8 is a flowchart illustrating operations for writing a file to flash memory using the file system of FIG. 6 according to some embodiments of the present invention.

FIG. 8 illustrates exemplary operations for writing a file to flash memory using a file system along the lines discussed above according to some embodiments of the present invention. If new static metadata is present, for example, if the file is being newly created and/or if static metadata, such as filename, is being changed, the static metadata is stored in a static metadata node in flash memory (blocks 810, 820). If the static metadata is not new, for example, if the file is already stored in the flash memory and only changes in dynamic metadata or data are to be made, static metadata of the file already stored remains unchanged. If new data is present, the data is stored in one or more data nodes (blocks 830, 840). If new data is not present, for example, if the file is being created and includes no data, storage of data may be bypassed. The file write operation may conclude with storage of dynamic metadata in a dynamic metadata node in the flash memory, the dynamic metadata including flash memory location information for the static metadata node and any data node(s) created (block 850).

Figure 9:
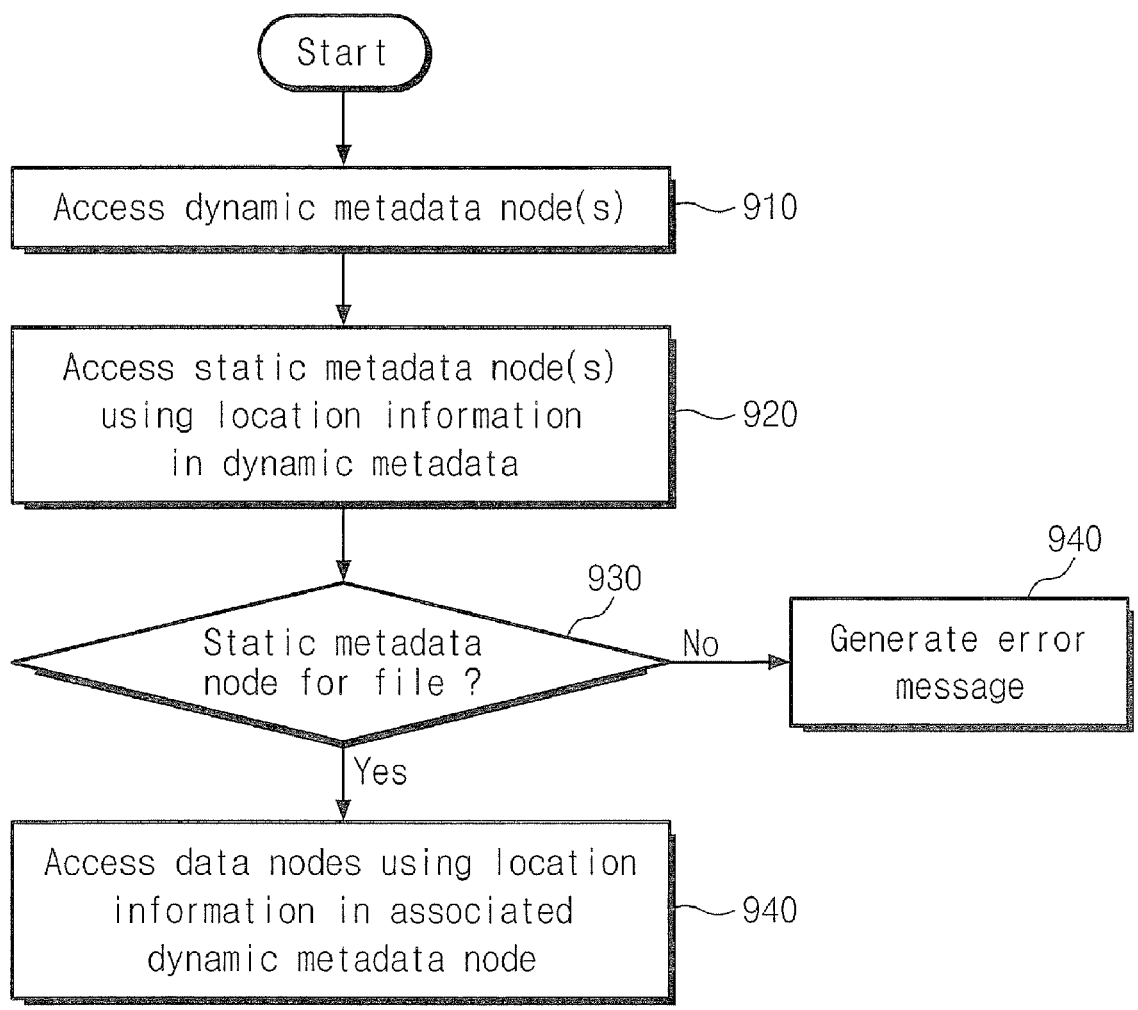
FIG. 9 is a flowchart illustrating operations for reading a file from flash memory of FIG. 6 according to some embodiments of the present invention.

FIG. 9 illustrates exemplary operations for reading a file from flash memory using a file system along the lines described above according to further embodiments of the present invention. To read a file, one or more dynamic metadata nodes stored in the flash memory are read to obtain flash memory location information for static metadata nodes associated therewith (block 910). One or more static metadata nodes are accessed using this location information to obtain file identification information for files stored in the flash memory (block 920). If a static metadata node corresponding to the requested file is located, data nodes containing data of the file are accessed using the flash memory location information in the dynamic metadata node associated with the static metadata node (blocks 930, 940). If the file is not located in the search of static metadata nodes, an error message (e.g., "file not found") may be generated (blocks 930, 950).

According to further embodiments of the present invention, the above-described file system may be further modified by adding a fourth type of file storage node that cross-references static file metadata nodes and dynamic file metadata nodes, such that locating a file need not involve retrieval of all dynamic metadata nodes stored in flash memory. Such an arrangement may help reduce the amount of system memory (e.g., RAM) needed to support the file system.

Figure 10:
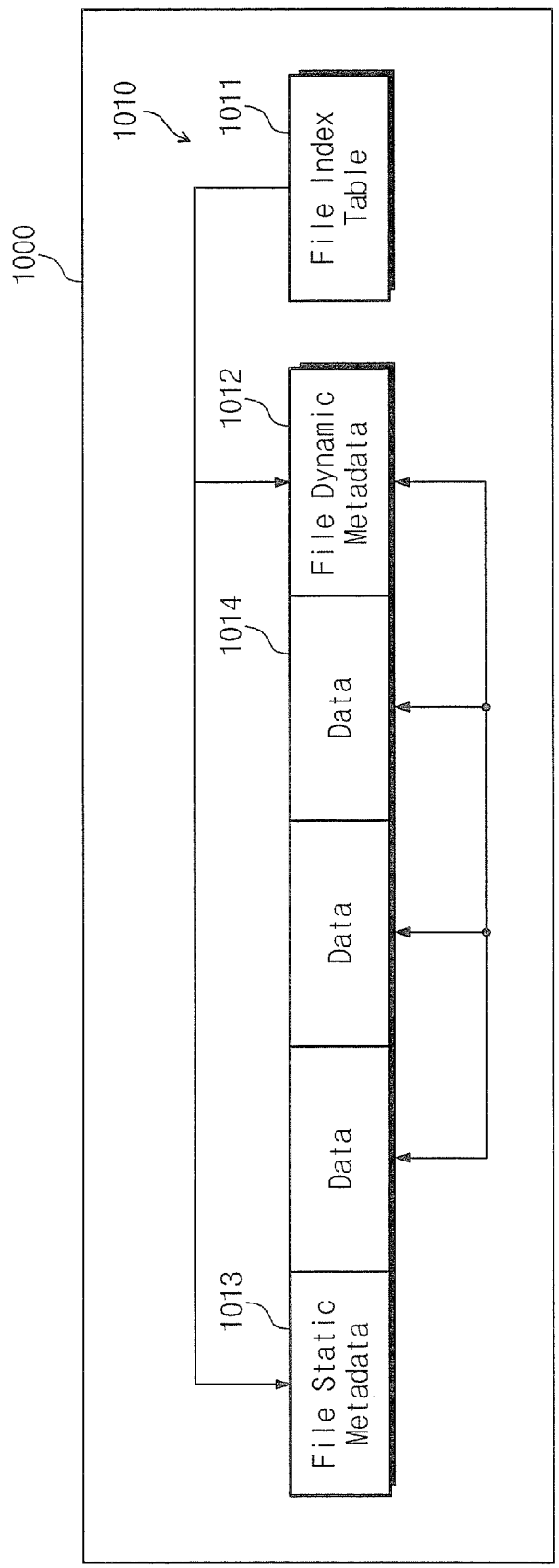
FIG. 10 is a schematic block diagram illustrating a file system according to some embodiments of the present invention.

FIG. 10 illustrates flash memory 1000 arranged using a file system 1010 according to further embodiments of the present invention. In the file system 1010, a file is stored in the flash memory 1000 using a first type of node 1011 including an index table that cross-references flash memory location information for a file dynamic metadata node 1012 with flash memory location information for a static metadata node 1013. Similar to the embodiments described above with reference to FIGS. 6-9, the dynamic metadata node 1012 includes dynamic file metadata, e.g., metadata of the file that tends to change frequently, such as file size, last modified time, file allocation information, and the like. The static metadata node 1013 includes static file metadata, e.g., metadata of the file that tends to change less frequently, such as file ID, created date, file name, and the like. Similar to the above-described embodiments, one or more data nodes 1014 include data from the file. The dynamic metadata node 1012 includes flash memory location information for the static metadata node 1013 and data node(s) 1014, such that the dynamic metadata node 1012 may be accessed to find the static metadata node 1013 and the data node(s) 1014.

Figure 11:
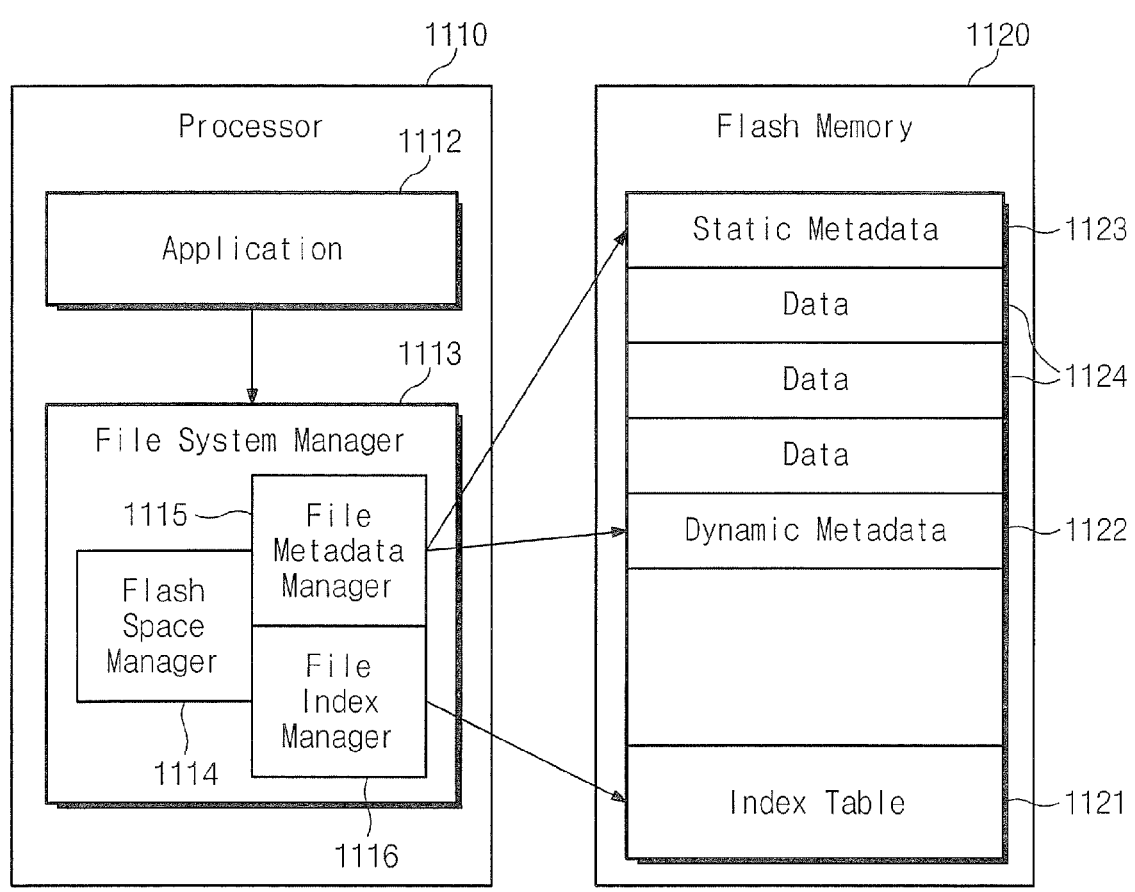
FIG. 11 is a schematic block diagram illustrating apparatus and operations for the file system of FIG. 10.

FIG. 11 illustrates apparatus and methods for implementing a file system including an index table node 1121, a dynamic metadata node 1122, a static metadata node 1123 and one or more data node 1124 for a file in a flash memory 1120 according to some embodiments of the present invention. An application 1112 executing on a processor 1110 provides data to a file system manager 1113 executing on the processor 1110. The file system manager 1113 is configured to store and retrieve data from the flash memory 1120. As illustrated, the file system manager 1113 may include a flash space manager 1114 configured to provide space management functions for file management in the flash memory 1120, such as identification and selection of free memory locations and garbage collection for invalidated memory locations. The file system manager 1113 also includes include a file metadata manager 1115 configured to manage the dynamic metadata node 1122 and the static metadata node 1123. The file system manager 1113 further includes a file index manager 1116 that is configured maintain the file index table node 1121, which cross-references flash memory location information for the dynamic metadata node 1122 and the static metadata node 1123.

Figure 12:
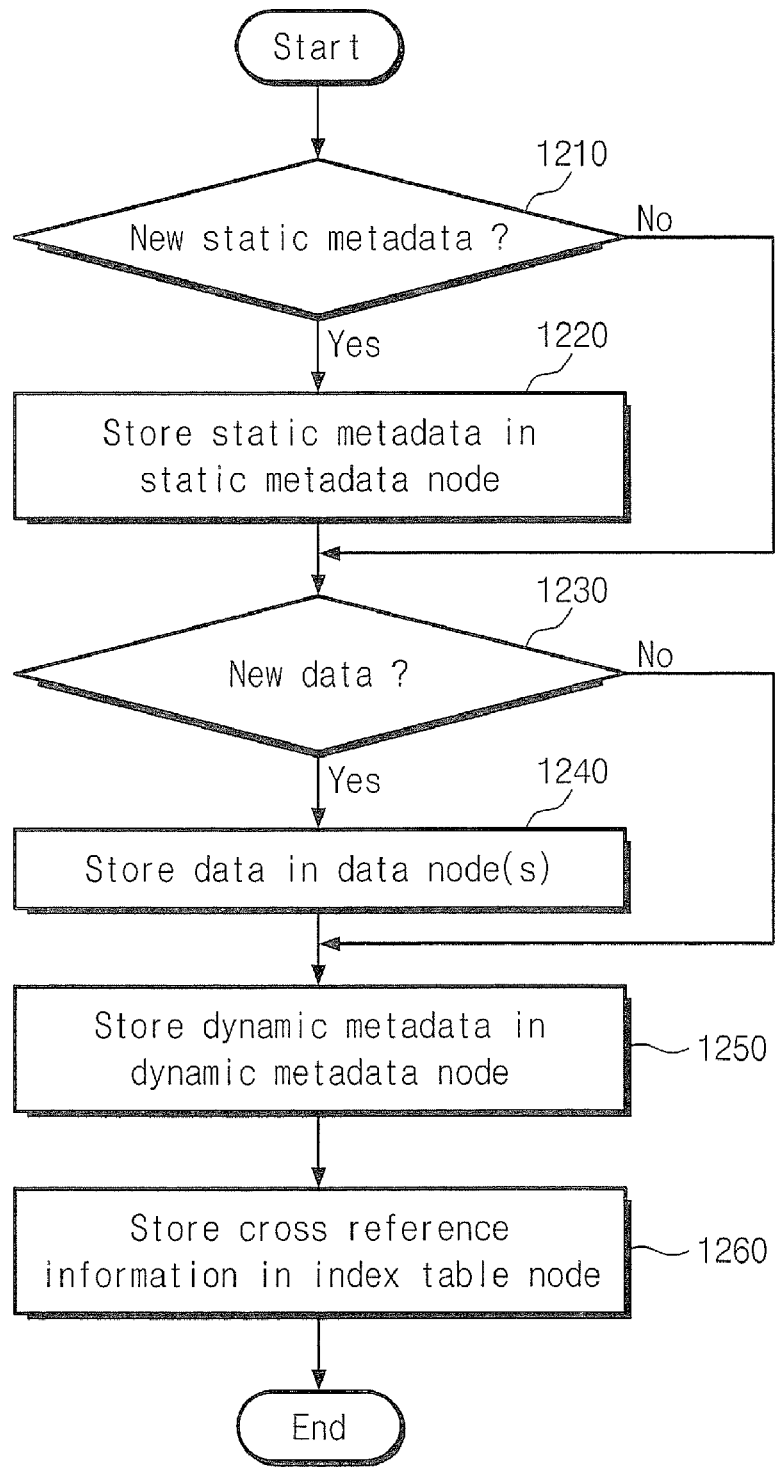
FIG. 12 is a flowchart illustrating operations for writing a file to flash memory using the file system of FIG. 10 according to some embodiments of the present invention.

FIG. 12 illustrates exemplary operations for writing a file to flash memory using a file system along the lines discussed above with reference to FIGS. 10 and 11 according to some embodiments of the present invention. If new static metadata is present, for example, if the file is being created, the static metadata is stored in a static metadata node in flash memory (blocks 1210, 1220). If the static metadata is not new, for example, if the file is already stored in the flash memory and only changes in data and dynamic metadata are to be made, static metadata of the file already stored remains unchanged. If new data is present, the data is stored in one or more data nodes (blocks 1230, 1240). If new data is not present, for example, if the file is newly created and includes no data, storage of data may be bypassed. Dynamic metadata is subsequently stored in a dynamic metadata node in the flash memory, the dynamic metadata including flash memory location information for the static metadata node and any data node(s) created (block 1250). Information cross-referencing flash memory location information for the static metadata node and the dynamic metadata node is stored in the flash memory in a file index table node (block 1260).

Figure 13:
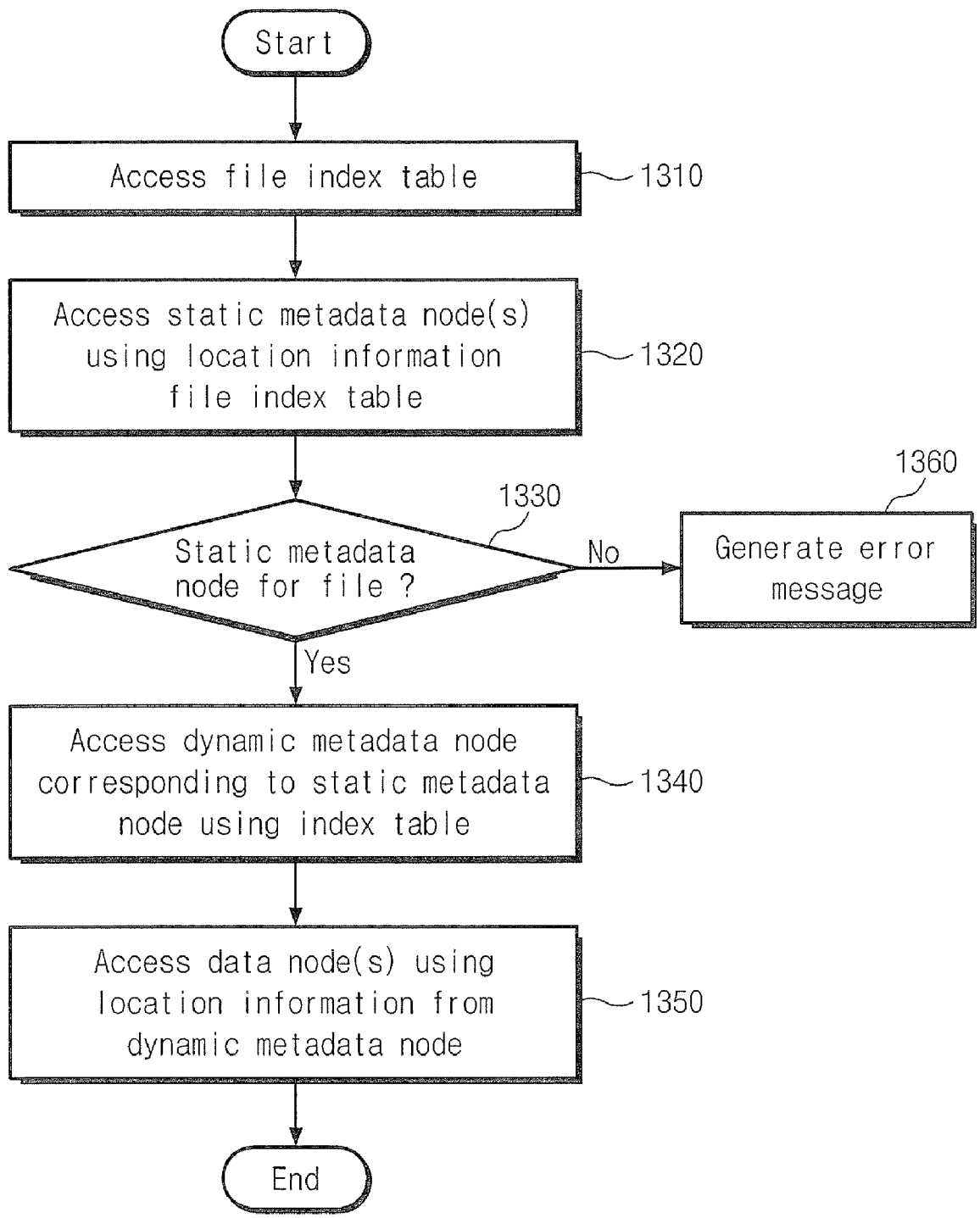
FIG. 13 is a flowchart illustrating operations for reading a file from flash memory using the file system of FIG. 10 according to some embodiments of the present invention.

FIG. 13 illustrates exemplary operations for reading a file from flash memory using a file system along the lines described above with reference to FIGS. 10 and 11 according to further embodiments of the present invention. To read a file, a file index table node stored in the flash memory is accessed (block 1310). Using location information from the file index table node, one or more static metadata nodes stored in the flash memory are read to attempt to find the requested file (block 1320). If an appropriate static metadata node is found, a corresponding dynamic metadata node is accessed using location information obtained from the index table (blocks 1330, 1340). If no corresponding static metadata node is found, an error message may be generated (block 1360). If a static metadata node corresponding to the requested file is located, data nodes containing data of the file may be accessed using the flash memory location information in the dynamic metadata node associated with the static metadata node (block 1350).

According to further embodiments of the present invention, a file system along the lines described above with reference to FIG. 6-9 or 10-13 may be modified to allow files to be stored in a flash memory in a piecewise fashion. Such an approach may be advantageous, for example, in reducing the risk of data corruption occurring while writing a file to flash memory, particularly for files, such as media files, in which small amounts of data can be lost without completely destroying the value of the file.

Figure 14:
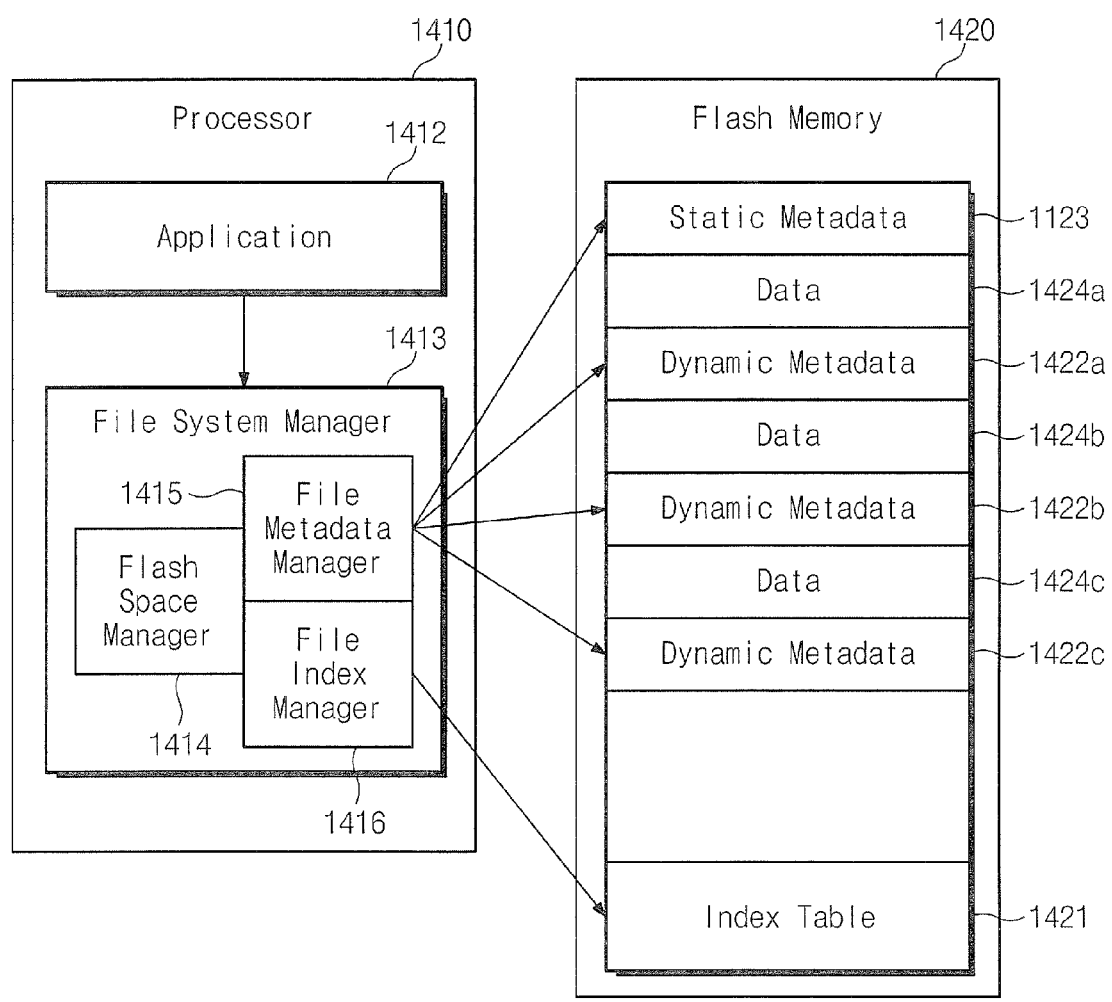
FIG. 14 is a schematic block diagram illustrating apparatus and operations for supporting a file system according to still further embodiments of the present invention.

FIG. 14 illustrates apparatus and methods for implementing such a system in flash memory according to some embodiments of the present invention. An application 1412 executing on a processor 1410 (the processor 1410 may include, for example, a computing device, such as microprocessor, and associated memory) provides data to a file system manager 1413 executing on the processor 1410. The file system manager 1413 is configured to store and retrieve data from a flash memory 1420. As illustrated, the file system manager 1413 may include a flash space manager 1414 configured to provide space management functions for file management in the flash memory 1420, such as identification and selection of free memory locations and garbage collection for invalidated memory locations. The file system manager 1413 also includes a file metadata manager 1415 configured to cause storage of a file using a static metadata node 1423 and dynamic metadata nodes 1422a-c, which are created concurrent with creation of respective data nodes 1424a-c in intermittent incremental file write operations discussed below with reference to FIG. 15. The file system manager 1413 further includes a file index manager 1416 that is configured to manage a file index table node 1421 that cross-references flash memory location information for the dynamic metadata nodes 1422a-c and the static metadata node 1423.

In contrast the embodiments described above with reference to FIGS. 10-13, in the file system shown in FIG. 14, files are stored in the flash memory in an intermittent incremental fashion. For example, in some embodiments, portions of the data of a file may be written periodically, with a new, updated dynamic metadata node 1422a-c being written in each of successive write cycles. Referring to FIG. 14, for example, in a first cycle, upon writing data node 1424a, dynamic metadata node 1422a is written, including flash memory location information for the data node 1424a and the static metadata node 1423. In a succeeding cycle, a second data node 1424b is written, along with a new dynamic metadata node 1422b that includes flash memory location information for the first data node 1424a, the second data node 1424b and the static metadata node 1423, such that the new dynamic metadata node 1422b supersedes the first dynamic metadata node 1422a. Similar operations may be performed in the next write cycle for the file for the third data node 1424c and the third dynamic metadata node 1422c.

Figure 15:
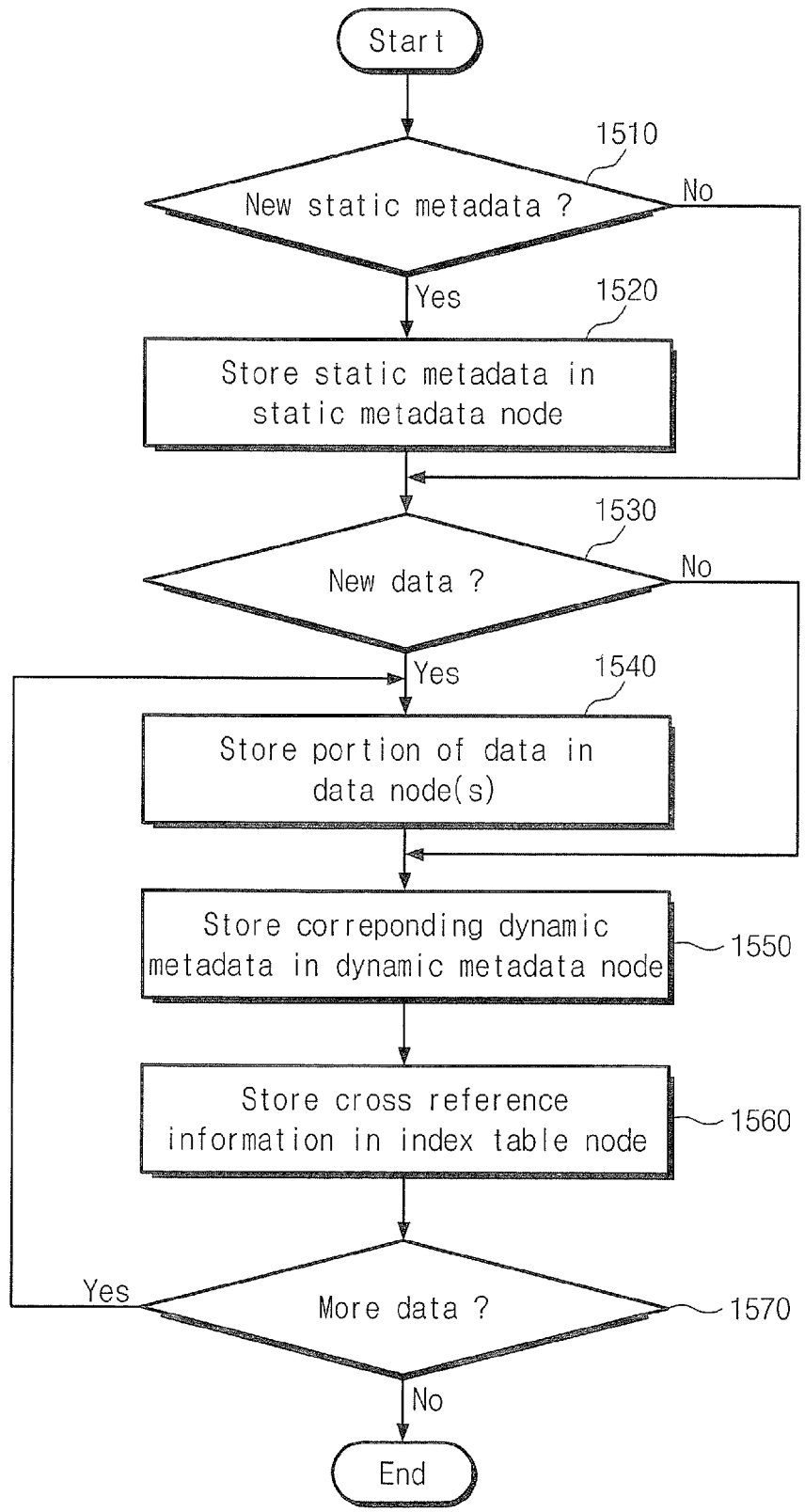
FIG. 15 is a flowchart illustrating operations for writing a file to flash memory using the file system of FIG. 10 according to some embodiments of the present invention.

FIG. 15 illustrates exemplary operations for writing a file to flash memory in a piecewise manner along the lines described above with reference to FIG. 14 in accordance with some embodiments of the present invention. If new static metadata is present, for example, if the file is being newly created, the static metadata is stored in a static metadata node in flash memory (blocks 1510, 1520). If the static metadata is not new, for example, if the file already exists and its static metadata is to be unchanged, static metadata of the file already stored in the flash memory remains unchanged. If new data is present, the data is stored in one or more data nodes (blocks 1530, 1540). In a recursive loop, portions of the data of the file are incrementally written to the flash memory (block 1540), along with storage of dynamic metadata in dynamic metadata nodes (block 1550) and storage of an index table in an index table node (block 1560). Recursive writing of data nodes, dynamic metadata nodes and index table nodes occurs until no more data remains to be stored for the file (block 1570). If new data is not present, for example, if the file is newly created and includes no data, storage of data may be bypassed. It will be appreciated that a file stored in the manner described above with reference to FIGS. 14 and 15 may be read using substantially the same operations described above with reference to FIG. 13, except that the operation of accessing a dynamic metadata node corresponding to a static node corresponding to the desired file (block 1340) may involve accessing the last written dynamic metadata node, which includes flash memory location information for data nodes written over a series of intermittent write cycles, e.g., the write cycles described with reference to FIG. 14.

It will be understood that, in some embodiments, the intermittent write cycles may be aperiodic and/or differing amounts of data may be written in each cycle. In further embodiments, periodic and aperiodic write operations may be selectively performed based on file type and/or other factors, and that intermittent operations and write operations along the lines of FIGS. 6-9 and 10-13 may be selectively applied based on file type and/or other factors. For example, relatively short files and/or files for which data integrity is important may be written using operations along the lines described above with reference to FIGS. 10-13, while longer files and/or less important files may be stored using operations along the lines discussed with reference to FIGS. 14 and 15.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims.

What is claimed is:

1. A method of managing a file in a memory, the method comprising:
    storing in the memory a first node comprising a first type of metadata of the file, a second node comprising data of the file and a third node comprising a second type of metadata of the file comprising file status and memory location information for the first and second nodes, wherein the third node comprises a node comprising memory location information for the second node and a node comprising an index table that cross-references a memory location for the memory location information for the second node to a memory location of the first node.

2. The method of claim 1, further comprising performing a file write operation wherein data of the file and the second type of metadata of the file are written as new nodes in the memory without writing the first type metadata in a new node in the memory.

3. The method of claim 2, further comprising periodically writing new nodes comprising respective portions of the data of the file and new nodes comprising the second type of metadata including memory location information for nodes comprising the portions of the data.

4. The method of claim 1, further comprising:
    retrieving memory locations for nodes comprising the first type of metadata based on the index table;
    reading nodes comprising the first type of metadata responsive to the retrieved memory locations;
    identifying the first node from among the read nodes comprising the first type of metadata;
    retrieving a memory location of the node comprising memory location information for the second node corresponding to the identified first node; and
    accessing the second node responsive to the retrieved memory location of the node comprising memory location information for the second node corresponding to the identified first node.

5. The method of claim 1, further comprising:
    reading the third node to retrieve memory location information for the first node and/or the second node; and
    accessing the first node and/or the second node based on the retrieved memory location information.

6. The method of claim 1, wherein the first type of metadata comprises information less likely to change than the second type of metadata.

7. The method of claim 1, wherein the first type of metadata comprises file identification information and/or file creation information and wherein the second type of metadata comprises file status information.

8. The method of claim 1, wherein the memory is arranged as a plurality of blocks, each comprising a plurality of pages, and wherein the second node is allocated a page.

9. A method of managing a file in memory, the method comprising:
    managing a first class of metadata of the file comprising file identification information and a second class of metadata of the file comprising file state information and memory location information of the file as respective first and second types of nodes in the memory.

10. The method of claim 9, wherein, over a series of write operations for the file, the second type of node is written to the memory more frequently than the first type of node.

11. The method of claim 9 comprising, in a file write operation for the file, writing a new node of the second type to a new memory location without writing a new node of the first type.

12. An apparatus comprising:
    a memory control circuit configured to communicate with a memory; and
    a file system manager circuit operatively coupled to the memory control circuit and configured to cause the memory control circuit to store in the memory a first node comprising a first type of metadata of a file, a second node comprising data of the file and a third node comprising a second type of metadata of the file comprising file status and memory location metadata for the first and second nodes, wherein the third node comprises a node comprising memory location information for the second node and a node comprising an index table that cross-references a memory location for the memory location information for the second node to a memory location of the first node.

13. The apparatus of claim 12, wherein the file system manager circuit is configured to cause a file write operation wherein data of the file and the second type of metadata of the file are written as new nodes in the memory without writing the first type metadata in a new node in the memory.

14. The apparatus of claim 13, wherein the file system manager circuit is configured to cause periodic writing of new nodes comprising respective portions of the data of the file and new nodes comprising the second type of metadata including memory location information for nodes comprising the portions of the data.

15. The apparatus of claim 12, wherein the first type of metadata comprises information less likely to change than the second type of metadata.

16. The apparatus of claim 12, wherein the first type of metadata comprises file identification information and/or file creation information and wherein the second type of metadata comprises file status information.

17. A computer program product comprising computer program code embodied in a computer-readable storage medium, the computer program code comprising:
  program code configured to cause storage in the memory of a first node comprising a first type of metadata of a file, a second node comprising data of the file in the memory and a third node comprising a second type of metadata of the file comprising file status and memory location information for the first and second nodes, wherein the third node comprises a node comprising memory location information for the second node and a node comprising an index table that cross-references a memory location for the memory location information for the second node to a memory location of the first node.

18. The computer program product of claim 17, wherein the computer program code further comprises program code configured to cause a file write operation wherein data of the file and the second type of metadata of the file are written as new nodes in the memory without writing the first type metadata in a new node in the memory.

19. The computer program product of claim 18, wherein the computer program code further comprises program code configured to cause periodic writing of new nodes comprising respective portions of the data of the file and new nodes comprising the second type of metadata including memory location information for nodes comprising the portions of the data.

20. A memory device comprising:
  a storage medium wherein a file is stored as a first node comprising a first type of metadata of the file, a second node comprising data of the file and a third node comprising a second type of metadata of the file including file status information and memory location information for the first and second nodes, wherein the third node comprises a node comprising memory location information for the second node and a node comprising an index table that cross-references a memory location for the memory location information for the second node to a memory location of the first node.

21. The device of claim 20, wherein the first type of metadata comprises information less likely to change than the second type of metadata.

* * * * *